April 1, 1930.                    G. E. OTIS                    1,753,157
                     HEATING AND VENTILATING APPARATUS
                        Original Filed Feb. 4, 1929
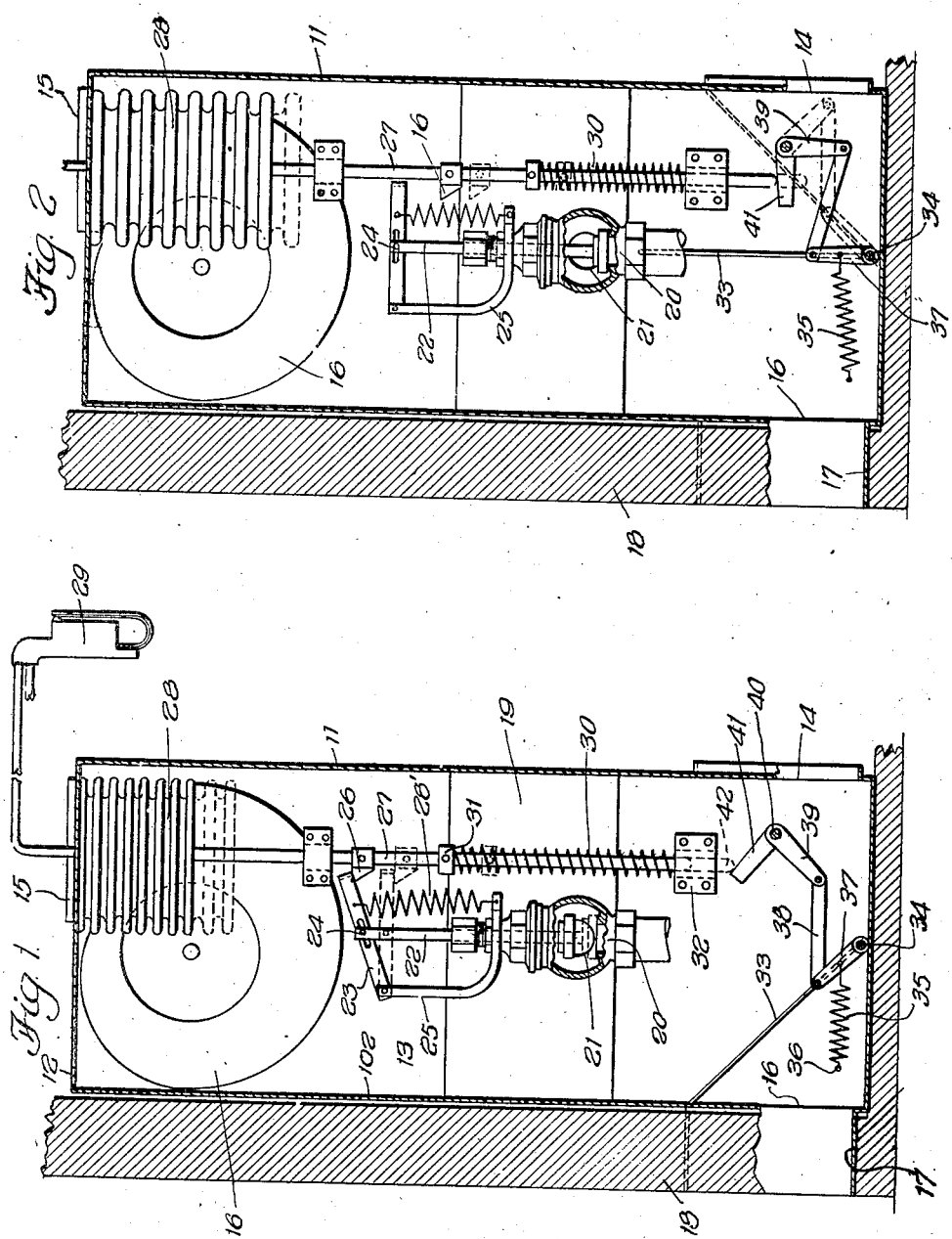
Witness                                         Inventor
William G. Kilroy                               Gerald E. Otis
                          By                    George J. Haught
                                                                Atty.

Patented Apr. 1, 1930

1,753,157

UNITED STATES PATENT OFFICE

GERALD E. OTIS, OF MOLINE, ILLINOIS, ASSIGNOR TO THE HERMAN NELSON CORPORATION, OF MOLINE, ILLINOIS, A CORPORATION OF ILLINOIS

HEATING AND VENTILATING APPARATUS

Application filed February 4, 1929. Serial No. 337,367. REISSUED

This invention relates to heating and ventilating apparatus.

For many years, in ventilating rooms occupied by a large number of persons, it has been the practice to introduce large quantities of fresh outdoor air upon the theory that indoor air must be constantly renewed or diluted to maintain a certain degree of atmospheric purity in the room. It was originally supposed that the chemical change created in the atmosphere of a room through respiration by human occupants had a harmfull effect and was the cause of discomfort and fatigue. It was later shown that the chemical change resulting from respiration and manifested by an increase in carbon dioxide was not harmful in the average building or under ordinary circumstances and that proportions of $CO_2$ greatly in excess of those found in the most crowded spaces were not prejudicial to either health or comfort.

Nevertheless, the practice of maintaining a standard of air purity continued on the basis that the so-called vitiated air of crowded spaces was dangerous due to the presence of micro-organisms given off in respiration. The presence of carbon dioxide was then held to be an index of impurity. More recent and extended scientific investigation attaches little or no importance to the micro-organic theory under usual conditions and indicates that the one and only cause of discomfort in crowded spaces is excessive atmospheric heat content.

It should be understood that ventilation is a broad subject. There are, of course, instances such as in mines where it is necessary to use fresh air to change the chemical characteristics of the atmosphere. There may also be times during epidemics when the atmosphere of crowded spaces contain dangerous micro-organisms. There are also cases in manufacturing processes and the treatment of diseases where the ventilation of a given space may require the introduction of fresh air or demand special treatment but the ordinary problem of ventilating spaces in modern buildings, particularly school class rooms, intended for occupancy by normal persons is merely a case of maintaining a proper and uniform effective or sensible temperature and this invention is directed to this class of work.

Nothwithstanding the fact that it is unnecessary to introduce large quantities of fresh air into crowded rooms to purify them it is necessary to remove the excess heat and in the case of school buildings and many other instances, the most convenient and practical way to remove excess heat is to dilute or replace the indoor air with a certain amount of cooler outdoor air. Practice in ventilation changes to this extent, however, that where it has previously been customary to introduce a constant amount of fresh air depending upon conditions of occupancy and without reference to weather conditions, the proper solution lies in the calibrated introduction of fresh air in variable quantities depending upon the heat content of the indoor atmosphere and that of the outdoor atmosphere. Only so much out of door air is needed as will accomplish the maintenance of a proper effective temperature indoors. In comparatively cold weather, little or no out of door air is required, whereas in comparatively warm weather a large amount may be required. Indeed in exceptionally warm weather it may be necessary to resort to refrigeration processes.

In many cases the ventilating apparatus heretofore used will accomplish the result required under the modern science of ventilation but they function in a very inefficient and wasteful manner since they preheat large volumes of cold outdoor air in order to maintain a comfortable temperature in cold weather when it is not necessary.

The general purpose of this invention is to eliminate the waste occurring in apparatus heretofore used, and provide apparatus having means which function to correlate the amount of outdoor air used to the requirements of the heating or cooling duty of the apparatus in controlling the effective temperature.

Some effort has been made heretofore to conserve fuel by providing for the recirculation of air within the room but it has been customary in these devices to use recirculated air and fresh air alternately rather than conjointly and even where it has been possible to mix the fresh and recirculated air it has been necessary to do so in some predetermined relation. Even in the most advanced of these devices the relation has been selective rather than compulsory, thereby permitting of waste if not actually demanding it.

A more particular object of the invention is to provide an apparatus in which the amount of fresh air admitted to the room is automatically calibrated with direct reference to the temperature requirements of the room and resides in providing a conditioning apparatus wherein interconnected means are so arranged and operated as to limit the introduction of outdoor air to an amount not in excess of that required for the purpose of decreasing the temperature of the air within the room to be conditioned thereby subserving the purpose of greatly reducing fuel expenditure and at the same time maintaining the comfort and well-being of the occupants.

Another object of my invention is to provide a conditioning apparatus wherein the heat output is entirely restricted before the introduction of cold air takes place so that there is no waste of artificial heat.

A still further object of the invention is to provide a conditioning apparatus wherein provision is made for recirculating the air within the room and while this condition prevails, gradually cutting down the heat input as required until it is negligible and then gradually admitting out of door fresh air and mixing the same with the recirculated air as required after the heat source has been cut down.

Another object of the invention is to provide a mechanism wherein a single primary operation controls the recirculated and outdoor air in conjunction with means which operate coincidentally and automatically to vary the heat output in accordance with sensible temperature requirements.

Other and further objects of the invention will more clearly appear from the description and claims hereinafter following.

In the drawings forming a part of this specification, Figure 1 is a vertical sectional view through the heating apparatus contemplated by the invention and showing a mechanism in position to exclude outdoor air and maintain continued operation of the heating means. And Figure 2 shows a similar view wherein the mechanism is in such condition as to cut off the recirculation of air through the apparatus and also cut off the heating means.

As shown in the drawings, the conditioning apparatus comprises a casing having a rear wall 10, front wall 11, top wall 12 and side walls 13, the casing preferably consisting of sheet metal. At the lower portion of the front wall there is provided a recirculating inlet 14 communicating with the air in the room to be heated, and the top wall of the casing has a discharge opening 15 through which the air is discharged by the fan 16 into the room to be heated. At the lower end of the rear wall 10 of the apparatus there is provided an inlet opening 16 which communicates through a duct 17 extending through the wall 18 with outdoor air.

Mounted within the central portion of the casing is a heating means 19 preferably in the form of a radiator, having an intake valve including a seat portion 20 and valve head 21, the valve 21, when in engagement with its seat, of course cutting off the circulation of heating fluid through the radiator. Secured to the valve head 21 is a reciprocable operating rod 22, said rod being pivotally connected to the lever 23 intermediate its ends, as indicated at 24, one end of the lever being pivotally supported by a fixed member 25. The opposite end of the lever 23 is normally urged downwardly to close the valve through the pressure exercised thereon by the tension spring 28'.

The free end of the lever 23 is disposed in the path of an actuating element 26 connected to an operating rod 27 in an adjustable manner, the upper end of which is secured to a motor 28, which in turn is activated by compressed air controlled by a thermostatic element 29 of a well-known type, the thermostat being adapted to expand the motor upon increase in temperature beyond a predetermined degree and to permit the same to contract when the temperature is lowered, the action of this device being well known and forming no part of the present invention except in combination with the elements referred to.

The rod 27 is normally urged in an upward direction by means of a coiled compression spring 30, which bears upon a collar 31 at its upper end and against a bracket 32 at its lower end, the lower end of the rod 27 being adapted to project through the bracket 32 for cooperation with the damper mechanism which now will be described.

The damper mechanism preferably comprises only a single damper indicated at 33 and pivotally secured centrally of the lower portion of the casing, as indicated at 34, the damper being of sufficient size to close the open air inlet 16, as shown in Figure 1, or the recirculating inlet 14, as shown in dotted lines in Figure 2. The damper is normally urged in position to close the outdoor air inlet 16 by means of a spring 35, said spring being connected at one end to a fixed pin 36 and at its opposite end to a crank 37 which moves with the damper 33. The crank 37 is connected by link 38 with the arm 39 of a bell crank lever pivoted at 40, the arm 41 of the bell crank lever being disposed in position to be engaged by the lower end 42 of the rod 27.

In operation with the parts in the position shown in full lines in Figure 1, it will be appreciated that the heating means in the form of the radiator 19 is operating at capacity, and the air entering the cabinet through the inlet opening 14 passes in contact with the radiator and re-enters the room through the discharge opening 15. This is an ideal condition for quickly heating the air in a room up to a desired point—say 70°.

Due to factors such as the bodily heat of the occupants, or rising temperature outdoors, the temperature in the room may rise rapidly and affect the thermostat 29. This will result in a downward movement of the rod 27, gradually causing approach of the valve head 21 to its seat 20 under the influence of the spring 26. The lower end of the rod 27 will engage the arm 41 of the bell crank lever, and impart counter-clockwise rotation thereto. This will result in retracting the link 38 and a swinging of the crank 37 connected to the damper 33, resulting in the damper 33 gradually opening the outdoor air inlet 16, the parts being so proportioned that the damper 33 is not moved to open the fresh air inlet until the valve head 21 has reached its seat and cut off the radiator. Should the temperature be such as to bring about continued operation of the motor 28 to effect further movement of the rod 27, the damper will gradually assume the dotted line position in Figure 2, so as to close the recirculating inlet 14 and permit free passage of the outdoor air through the apparatus to discharge into the room.

When the temperature is reduced to such an extent that the motor is no longer expanded but begins to contract, the rod 27 begins its upward movement permitting the damper 33 to be pulled by the spring 35 toward its position to close the outdoor air inlet 16; coincidentally with this operation, the actuating member 26 again lifts the lever 23, resulting in the valve 21 leaving its seat after the damper 33 has reached its closed position, and admitting the heating fluid once more to the radiator 19.

Attention is particularly called to the fact that as soon as the damper begins to move to open the outdoor air inlet, the heat output of the radiator is cut off and when the damper has reached an extreme position, the recirculating inlet 14 is also closed. By this expedient it is apparent that there is a cooperative relation between the three elements which results in avoiding the necessity for the admission of large quantities of fresh air necessary to overcome the combined effect of the radiator and the recirculating air when it is desired to reduce the sensible temperature in a room; on the contrary, only so much outdoor air is admitted as will reduce the temperature of the air in the room. Particular attention is also called to the fact that when air is first admitted to the apparatus during the first travel of the damper, even though the heat output of the heating element has been cut off, the cold outdoor air mixes with the recirculated air and is warmed thereby to some extent so that the danger of the admission into the room of very cold air is entirely obviated, this condition obtaining until the damper has entirely closed off the recirculating inlet 14 of the cabinet.

While I have herein shown and described what I now consider the preferred manner of carrying out my invention, the same is merely illustrative and I contemplate all changes and modifications that come within the scope of the claims appended hereto.

I claim:

1. In an apparatus of the character described, the combination with a housing having a recirculating inlet for indoor air and an inlet for outdoor air, and an outlet through which said air is discharged into an indoor compartment; heating means arranged within said housing; and co-ordinated regulating mechanism for controlling said heating means, said indoor air inlet, and said outdoor air inlet, said means serving upon operation to restrict the heat output of the heating means and the ingress of recirculated air coincidentally with the admission of outdoor air into said housing.

2. In an apparatus of the character described, the combination with an enclosing housing having an inlet communicating with the air of an indoor compartment and having an outlet communicating with said compartment; heating means within said housing; and controlling elements interconnected for coincidentally cutting down the heat output of said heating means and simultaneously restricting ingress of air through said indoor air inlet.

3. In a construction of the character described, the combination with a room to be heated; of a housing disposed within said room and having an inlet communicating with outside air, an inlet communicating with indoor air, and an outlet communicating with said room; of heating means arranged within said housing; interconnected means for regulating the heat output of the heating means, and ingress of air from the indoor and outdoor air inlets; and thermostatically controlled means for actuating said regulating means.

4. In a construction of the character described, the combination with a room to be heated; of a housing disposed within said room and having an inlet communicating with outside air, an inlet communicating with indoor air, and an outlet communicating with said room; of heating means arranged within said housing; means for regulating the heat output of the heating means, and ingress of air from the indoor and outdoor air inlets; and thermostatically controlled means for actuating said regulating means, said regulating means being interconnected and so disposed as to effect restriction of the heat output and ingress of indoor air coincidentally with the ingress of outdoor air.

5. In an apparatus of the character described, the combination with an enclosing housing having an outdoor air inlet, an indoor air inlet and an outlet communicating with a room to be heated; of heating means disposed within said housing; damper means for opening and closing the outdoor and indoor air inlets in inverse relation; regulating means for energizing and de-energizing said heating means; and means interconnecting said damper means and said heat regulating means to cut down the heat output coincidentally with admission of outdoor air and restriction of indoor air.

6. In an apparatus of the character described, the combination with an enclosing housing having an outdoor air inlet, an indoor air inlet and an outlet communicating with a room to be heated; of heating means disposed within said housing; damper means for opening and closing the outdoor and indoor air inlets in inverse relation; regulating means for energizing and de-energizing said heating means; means interconnecting said damper means and said heat regulating means to cut down the heat output coincidentally with admission of outdoor air and restriction of indoor air; and thermostatically controlled means for actuating said damper and heat regulating means.

7. In an apparatus of the character described, the combination with a housing having an inlet for outdoor air and an inlet for indoor air, and a discharge outlet communicating with a room to be heated; heating means arranged within said housing; regulating means for controlling said heating means; a single damper adapted to open and close one or the other of said indoor air and outdoor air inlets; and means for coincidentally actuating said regulating means and said damper, to cut down the heat output when said damper is moved to open said outdoor air inlet, and increase the heat output when said damper is moved toward closed position.

8. In a construction of the character described, the combination with a room to be heated, of a housing having an inlet communicating with outside air, an inlet communicating with indoor air, and an outlet communicating with said room, of heating means arranged within said housing, inter-connected means for regulating the heat output of the heating means, and ingress of air from the indoor and outdoor inlets, and thermostatically controlled means for actuating said regulating means.

9. In a construction of the character described, the combination with a room to be heated, of a housing having an inlet communicating with outside air, an inlet communicating with indoor air, and an outlet communicating with said room, of heating means arranged within said housing, means for regulating the heat output of the heating means, and ingress of air from the indoor and outdoor inlets, and thermostatically controlled means for actuating said regulating means, said regulating means being interconnected and operable to increase the heat output while air is being admitted through the indoor inlet, and to restrict the heat output while heat is being admitted through the outdoor air inlet.

10. In a construction of the character described, the combination of a room, the air in which is to be conditioned, a housing having an inlet communicating with outside air, an inlet communicating with indoor air, and an outlet communicating with said room, a heating radiator for heating the air for said room, valve means for regulating the heat output of said radiator, damper mechanism for said indoor and outdoor inlets for relatively regulating ingress of air therefrom, and thermostatically operated means responsive to air conditions in the room for controlling said radiator regulating valve means and said damper mechanism.

11. In a construction of the character described, the combination of a room, the air in which is to be conditioned, a housing having an inlet communicating with outside air, an inlet communicating with indoor air, and an outlet communicating with said room, a heating radiator for heating the air for said room, valve means for regulating the heat output of said radiator, damper mechanism for said indoor and outdoor inlets for relatively regulating ingress of air therefrom, and thermostatically operated means responsive to air condition in the room and arranged to control said radiator regulating valve means and said damper mechanism in successive relation to each other.

In witness that I claim the foregoing I have hereunto subscribed my name this 5th day of January, 1929.

GERALD E. OTIS.